(12) United States Patent
Kejha et al.

(10) Patent No.: US 7,141,332 B2
(45) Date of Patent: Nov. 28, 2006

(54) LIGHTWEIGHT PRISMATIC PACKAGING STRUCTURE FOR ELECTROCHEMICAL DEVICES AND ASSEMBLY METHOD OF THE SAME

(76) Inventors: Joseph B. Kejha, 1022 Frederick Rd., Meadowbrook, PA (US) 19046; David Chua, 845 Babb Cir., Wayne, PA (US) 19087; Hsiu-Ping Lin, 27 Foxcroft Dr., Princeton, NJ (US) 08540

( * ) Notice: Subject to any disclaimer, the term of this patent is extended or adjusted under 35 U.S.C. 154(b) by 651 days.

(21) Appl. No.: 10/201,759

(22) Filed: Jul. 23, 2002

(65) Prior Publication Data

US 2004/0018425 A1    Jan. 29, 2004

(51) Int. Cl.
*H01M 2/02* (2006.01)
*H01M 2/08* (2006.01)
*H01M 10/04* (2006.01)
*H01G 2/10* (2006.01)

(52) U.S. Cl. ............... 429/176; 429/185; 429/163; 429/171; 429/174; 429/178; 429/181; 29/623.2; 29/623.4; 361/518; 361/517; 361/536; 361/535

(58) Field of Classification Search ............... 429/176, 429/185, 163, 171, 174, 178, 181; 29/623.2, 29/623.4; 361/518, 517, 536, 535
See application file for complete search history.

(56) References Cited

U.S. PATENT DOCUMENTS

2004/0115528 A1*  6/2004  Helmich ............... 429/181

* cited by examiner

*Primary Examiner*—Patrick Joseph Ryan
*Assistant Examiner*—Angela J. Martin

(57) ABSTRACT

The present invention pertains to lightweight, hard and leakproof prismatic packaging structures for electrochemical devices and economical method of assembly and hermetic sealing of said structures by plastic layers attached to their metal walls. Metal welding is avoided and superior protection of lithium polymer cells and other cells is thus provided at lesser cost.

38 Claims, 5 Drawing Sheets

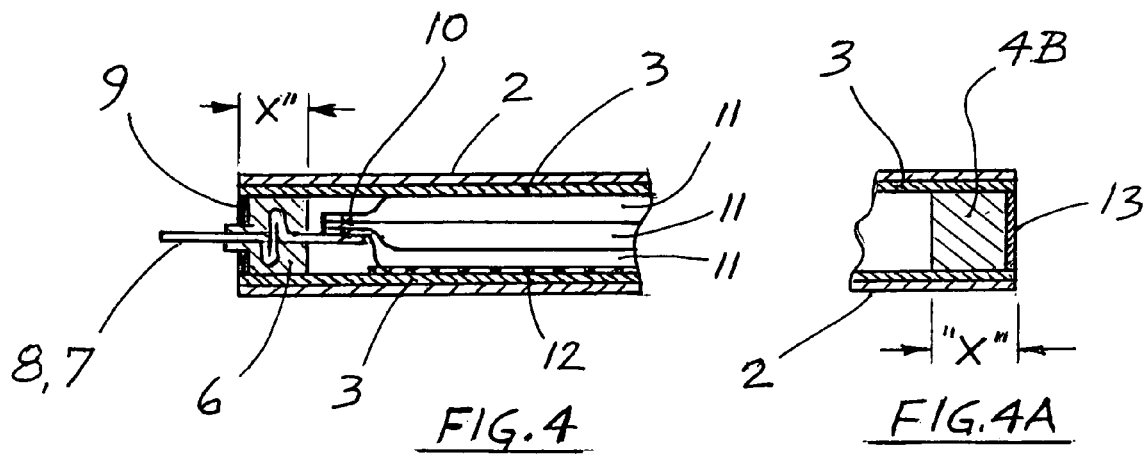
FIG.4
FIG.4A
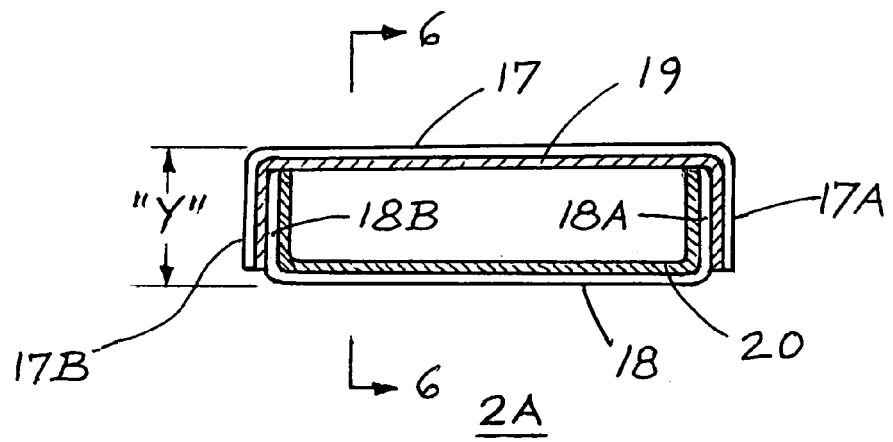
FIG.5

LIGHTWEIGHT PRISMATIC PACKAGING STRUCTURE FOR ELECTROCHEMICAL DEVICES AND ASSEMBLY METHOD OF THE SAME

CROSS REFERENCE TO RELATED DOCUMENTS

The subject matter of the invention is shown and is described in the Disclosure Document of Joseph B. Kejha Ser. No 490,164 filed on Mar. 8, 2001, and entitled "Packaging of Lithium Based Polymer Cells and Batteries."

BACKGROUND OF THE INVENTION

1. Field of the Invention

This invention pertains to construction of lightweight, leakproof, and moisture-proof packaging enclosures for various electrochemical devices, such as lithium-ion-polymer batteries, ultracapacitors and other kinds of batteries and devices, in which said enclosures, have hard metal walls joined and sealed by heat welding of plastic layers attached to them. This invention also describes the method of assembly of said enclosures.

2. Description of the Prior Art

Prior art lithium polymer prismatic cells are usually heat sealed in a soft and thin aluminum, plastic coated foil pouches or bags, which may be later inserted into a hard box to create a multi-celled battery with the cells in series, as described in the U.S. Pat. No. 5,057,385 (claim 1), and U.S. Pat. No. 5,350,647 of Hope at al. The polymer cells do not require hard casings to hold them together because they are laminated, (welded or glued). The aluminum foil protects the cells from moisture, and the plastic layer is used for heat weld seal. Major problem is with the sealing of the cell terminals existing from the pouch, due to the steps in the thickness of the seal, caused by the flat foil terminals presence. The plastic layers during welding do not always flow into the gaps created by the terminals, which creates openings and leaks of the electrolyte, or a moisture entry into the pouch, and thus spoilage of the cell. The aluminum pouch is also a poor protector of the cell, since it can be easily punched through by a sharp object, also bends easily or cracks at the corners when the seal is folded, which again creates leaks and/or spoilage of the cell. Sometimes the terminals during the seal welding cut through the plastic layer and touch the aluminum foil, which causes electronic shorts and damage to the cells and thus a low production yield.

The prismatic, liquid electrolyte lithium based cells, nickel metal hydride cells, or prismatic capacitors, ultracapacitors or other electrochemical devices are usually inserted into a rectangular hard metal vessel having a metal lid with insulated terminals welded to the vessel which seals the devices therein. The hard casing is necessary to hold the cells or devices tightly together, and to create a pressure on the stack of the cells for proper functioning.

The described prior art hard casings are expensive, heavy, slow to weld, and have size limitations, due to the limited stiffness of the casings and their ability to maintain pressure on the stack. The heavy casings decrease the energy density of the devices.

Prismatic packaging structure for electrochemical devices of this invention does not suffer from prior art problems and provides superior cell protection, energy density improvements, reduced cost, and many other positive advantages.

SUMMARY OF THE INVENTION

It has now been found, that a hard, lightweight and sealed structure of prismatic packaging enclosure for electrochemical devices, such as lithium-ion-polymer cells, various batteries, capacitors, ultracapacitors and other kind of electrochemical devices can be made by heat-welding plastic coated or claded, preferably aluminum tubing extrusions, or metal sheets formed into "u" channels and then into rectangular tubing, and that the tubing's both ends can be closed and heat-sealed by plastic end plugs with a metal layer attached to them. Selected plastic end plugs may have embedded-in them and sealed metal terminals, preferably ultrasonically welded to metal terminal tabs of the particular device's electrodes, and may have also embedded in an electrolyte filling connectors. The enclosure can be also made from a plastic coated deep drawn metal vessel and sealed by a similar plastic plug with a metal layer attached, and with embedded-in metal terminals insulated from the metal layer. The preferred plastic is "Surlyn" as manufactured by DuPont Corp., or other plastic which attaches easily to the metals. The plugs may be also hollow or relieved to save weight.

Because the lithium polymer based electrochemical devices are laminated together and do not require the holding pressure by their outside casings, the described had and punch-proof enclosure of the invention in this case can be relatively thin, lightweight, and of unlimited size, but should be thicker than the prior art soft aluminum pouch, to provide a good protection to the cells. Other devices may require thicker enclosures.

Method of assembly of the enclosure has been also found in order to provide a leak-proof seal-weld of the square or rectangular end plugs to the square or rectangular tubing: The hot clamping device providing heat and pressure on the joint should be preferably pressing in the direction of two opposing corners of the square or rectangular tubing (45° to the tubing walls), in two steps. The tubing may be rotated 180° lengthwise and the heat-sealing is then repeated against the other two corners.

The principle of the invention is to use only the plastic attached to metal for fast and economical welding, sealing and holding the hard metal structure together, while avoiding slow and expensive metal welding. The metal layers protect the cells from moisture.

The principal object of this invention is to provide a lightweight, more reliable and economical packaging structure for lithium based prismatic cells and batteries, as well as other electrochemical devices.

Another object of this invention is to provide reliable and economical method of assembly of the packaging structure for various and preferably prismatic electrochemical devices. Other objects and advantages of the invention will be apparent from the description and claims.

BRIEF DESCRIPTION OF THE DRAWINGS

The nature and characteristic features of the invention will be more readily understood from the following description taken in connection with the accompanying drawing forming part hereof in which:

FIG. 4 is a diagrammatic, side elevational, partially sectional view of the enclosure containing a stack of cells connected to the terminals.

FIG. 5 is a diagrammatic front elevational view of another embodiment of the enclosure's tubing, formed from two plastic coated channels sealwelded together.

Like numerals refer to like parts throughout the several views and figures.

Figure 1:
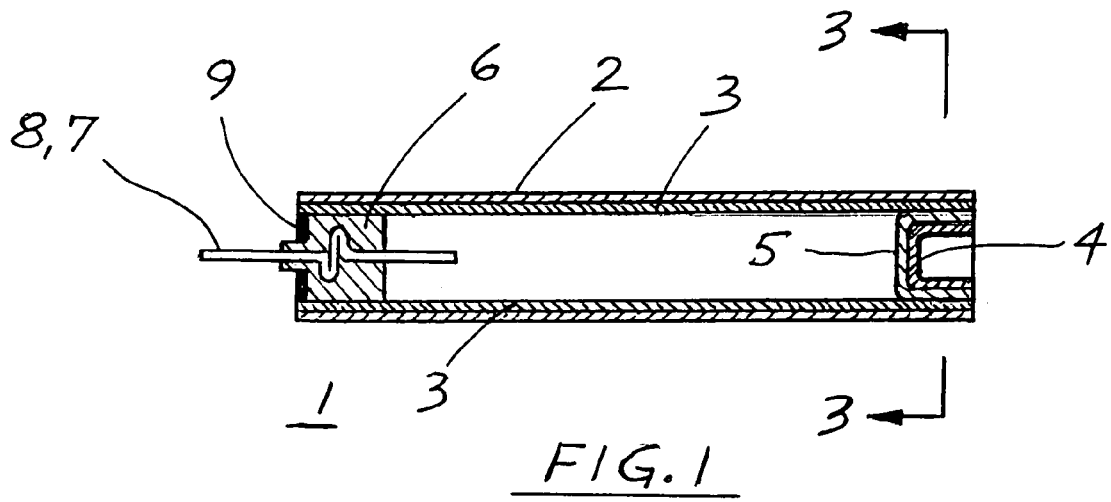
FIG. 1 is a diagrammatic, side elevational, sectional view of the enclosure, illustrating its components and their layers.

It should, of course, be understood that the description and the drawings herein are merely illustrative, and it will be apparent that various modifications, combinations and changes can be made of the structures and the systems disclosed without departing from the spirit of the invention and from the scope of the appended claims.

DESCRIPTION OF THE PREFERRED EMBODIMENTS

When referring to the preferred embodiments, certain terminology will be utilized for the sake of clarity. Use of such terminology is intended to encompass not only the described embodiment, but also all technical equivalents which operate and function in substantially the same way to bring about the same results.

Packaging enclosures for prismatic electrochemical devices, and for example lithium-ion batteries, nickel metal hydride batteries, and ultracapacitors usually employ a hard metal box structure which is sealed by a metal welding method, such as laser welding. Lithium polymer batteries are usually heat sealed in a soft plastic coated metal foil pouch, which requires an additional protection by a non-sealed, hard box. The present invention employs a novel prismatic enclosure structure, which is more reliable and less costly and its method of assembly results in improved cells or devices with many advantages.

Referring now in more detail, particularly to the drawings of this patent and FIGS. 1–4 inclusive, one embodiment of this invention is enclosure 1 comprising hard rectangular or square cross section metal tubing 2, which may be an extrusion of aluminum, coated or claded on the inside and optionally also on the outside by a heat sealable plastic layer 3, a rectangular or square metal back plug 4, which may be a deep drawn cup, and which is coated or claded or encapsulated by a heat sealable plastic layer 5, and a solid plastic rectangular or square front plug 6, which has embedded-in and sealed metal terminals 7 and 8.

The plastic plug 6 may have also a metal plate 9 attached to it, which plate covers the entire side of the plug 6, but does not touch the terminals 7 and 8 due to larger openings 7A and 8A. The terminals 7 and 8 may be electroconductively attached and preferably by ultrasonic welds to terminal tabs 10 of at least one or several cells 11, which cells may be as described in our prior patent application Ser. No. 10/119,220, and may be inserted into the enclosure 1, prior to sealing, as shown in FIG. 4. The plastic plugs 4 and 6 are then heat welded (sealed) and bonded to the plastic layer 3 attached to the tubing 2, by a method to be described.

The tubing 2 may be a seamless metal extrusion, or it may have a seam or seams, preferably on the vertical side(s).

Either plug 4 or 6 may have also embedded-in or sealwelded a safety vent, and a closeable or sealable tubing, or an orifice for filling the enclosure with an electrolyte (not shown). Both plugs 4 and 6 should be made to fit snugly into the tubing 2, or may be press-fitted. The tubing 2 and coating 3 may have also inside corners with radii to fit the radii on the plug 4 with coating 5, and the plug 6.

Optionally, the cells 11 may be tightly fitted into the enclosure 1 with the help of a shim 12, which shim may be of a fabric, such as a glass non-woven or a woven fabric, or other flexible or compressible material, as shown in FIG. 4.

The preferred plastic material of the layers 3 and 5 and the plug 6 is polymeric plastic material sold under the name of "Surlyn", as manufactured by DuPont Corp., Wilmington, Del. Any polymeric material, which attaches easily and strongly to metals, which may be due to an acid salt groups presence, is also suitable, such as (poly) vinylacetate, polyethylene, polypropylene, or (PVDF) polyvinylidene fluoride, their alloys and copolymers.

The preferable metal for the tubing 2, plug 4 and plate 9 is aluminum, and preferably should be at least 0.015 of inch thick, or more. Other metals like magnesium, titanium or stainless steel are also suitable, depending on the product application. Preferable thickness of layers 3 and 5 is 0.001 to 0.010 of inch. The polymeric plastic material should be the same in both layers and in the plugs.

It should be noted that the plug 4 may be replaced by plug 4B also of solid plastic like the plug 6, or may be hollow or with a relief to reduce its weight. In this case the plug 4B should have attached a metal layer 13 similar to the plate 9, which layers may be foils and can be attached to the plugs by well known means of heat and pressure, as shown in FIG. 4A. The metal layers 9 and 13 should be a little smaller than the plugs 4B and 6 to permit compression of the plugs during welding under pressure. Preferable depth "x" or thickness of the plug is from 1/8" to 1/2", and more preferably about 1/4". Both plugs may be molded and mass produced. Production of both plugs' subassembles with the terminals embedding and the plates attachment can be fully automated by well known means.

Figure 11:
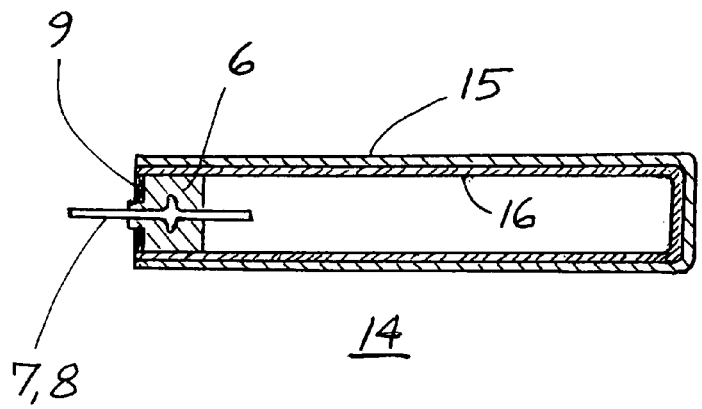
FIG. 11 is a diagrammatic, side elevational, sectional view of the enclosure's deep drawn vessel with front end plastic plug and terminals.
Figure 12:
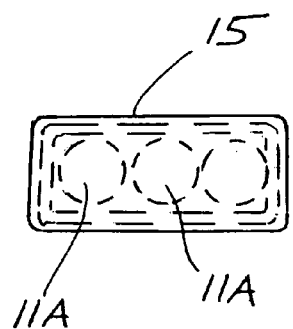
FIG. 12 is a diagrammatic, back elevational view of the enclosure's deep drawn vessel.

Referring now to FIGS. 11 and 12, which represent another embodiment of the invention, and in which the enclosure 14 comprises: metal vessel 15, which may be deep drawn and having rectangular or square cross section, with inside coated plastic layer 16, which may be the same or similar to the plastic coatings described above, and the plug 6 with the plate 9 and terminals 7 and 8. The cells 11 may be similarly inserted-in before the sealing, as shown in FIG.

4. The plastic coating may be also applied to the vessel 15 by a dip-coating method in which the vessel 15 is completely coated inside and outside (not shown). Similarly, the tubing 2 and the plug 4 in FIG. 1 may be also dip coated (not shown). The plug 6 is then heat sealed and bonded to the plastic layer 16 by a method to be described.

Figure 6:
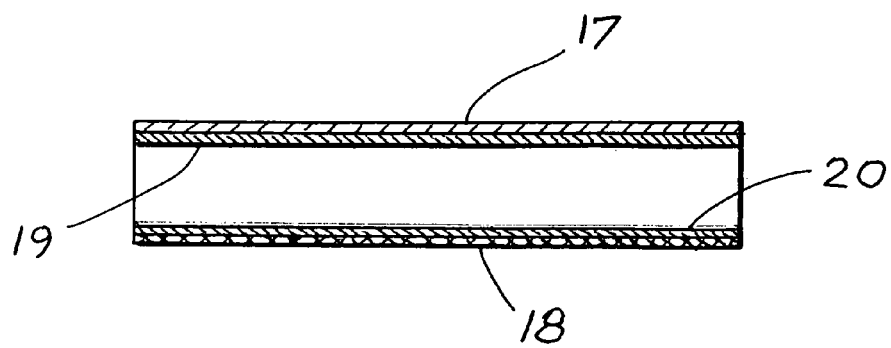
FIG. 6. is a diagrammatic, side elevational, sectional view of the enclosure's tubing at the line 6—6 of FIG. 5.

Another embodiment of the invention is shown in FIGS. 5 and 6, which illustrates rectangular or square tubing assembly 2A, constructed from two metal channels 17 and 18, with heat sealable plastic layers 19 and 20, which plastic may be identical to the plastic in layers 3 and 5, as described above in FIGS. 1–4. The channels 17 and 18 may be also dip-coated, or coated on both sides, or encapsulated by said plastic (not shown). The channels 17 and 18 are first heat welded and sealed together by the layers 19 and their flanges 17A and 18A to form a rectangular or square tubing assembly 2A. The tubing assembly 2A can be then rotated 180° to heatweld and seal also the other flanges 17B and 18B of said channels. The tubing 2A can replace the tubing 2 in the enclosure assembly 1 shown in FIGS. 1–4. The channels' 17 and 18 thickness may be even thinner than the tube 2 walls or the deep drawn vessel 15 walls, because the metal sheets are possible to be made thinner than the extrusion walls. The "y" dimension of the flanges should be at least ⅛".

This construction of the tubing permits more design flexibility in changing the thickness of the cells or cell packs and their footprint, because the channels can be easily custom bent from flat, claded metal stock to fit the required dimensions.

Figure 13:
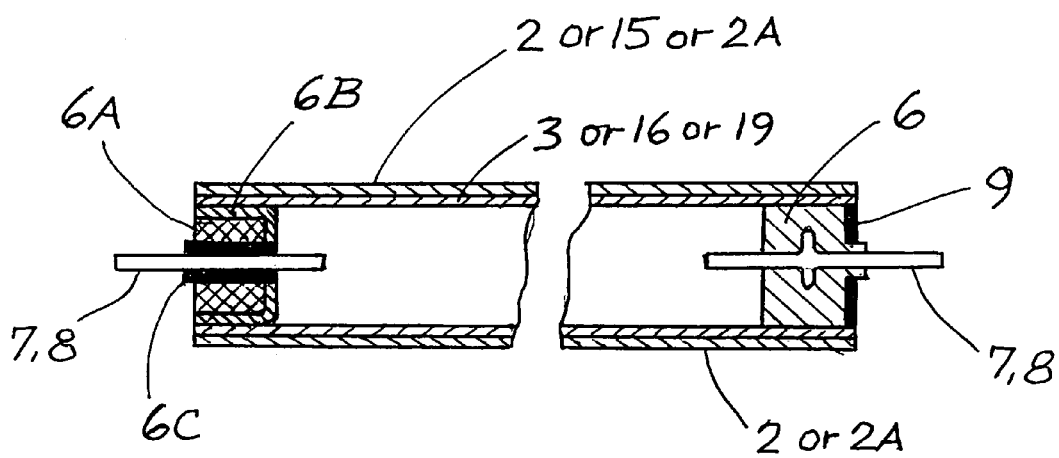
FIG. 13 is a diagrammatic, side elevational, partially sectional view of the enclosure's tubing or vessel with plastic coated metal front end plug having sealed-in terminals by an insulating substance.

In all described structures, the plastic plug 6 and plate 9 may be also replaced by a metal plug 6A, having heat sealable plastic layer 6B on its outside surface, and having metal terminals 7 and 8 sealed-in by an electrically insulating substance 6C, such as a plastic or glass material, as shown in FIG. 13. The metal terminals 7 and 8 are not in contact with the metal plug 6A.

The same enclosure construction as shown in FIGS. 1–6 inclusive and in FIGS. 11, 12, and 13, may be also used for the construction of the main battery box with cells, or packs of cells electrically connected in series. Each cell or parallel pack of cells can be sealed in a plastic bag or pouch to separate the electrolytes of each cell and thus built up voltage, and may be stacked similarly as shown in FIG. 4. In case of lithium batteries requiring electronic circuit protection of each cell, each cell or cell pack may have also separate and individually sealed terminals embedded-in and passing through the plug 6 (not shown). Although the described packaging structures are intended mostly for enclosing of prismatic electrochemical devices, cylindrical or any other shape cells or devices 11A may be also inserted therein, as shown in FIG. 12, and connected to the terminals. It is apparent that all the described types of plugs may be used in any suitable combination with said tubings or vessels, including two plugs 6 or 6A with terminals electroconductively connected to the devices and being at both ends of the tubing 2 or 2A as shown in FIG. 13, which is another embodiment of the invention. The heat sealed plastic layers serve also as an insulation to prevent electrical shorts. When the heat sealable plastic layers 3, 16, and 20, or 5 and 6B are omitted, the enclosure 1 or 14 is still heat sealable, because the only one heat sealable plastic layer between the metal parts, or the heat sealable plastic plugs alone are good enough to be attached to the metal tubing 2 or 2A, or vessel 15. This construction is useable in case when the cells or cell packs can touch the metal enclosure, and it is another embodiment of the invention. The terminals 7 and 8 may have any desirable shape, and are not limited to just flat shapes as shown.

Figure 7:
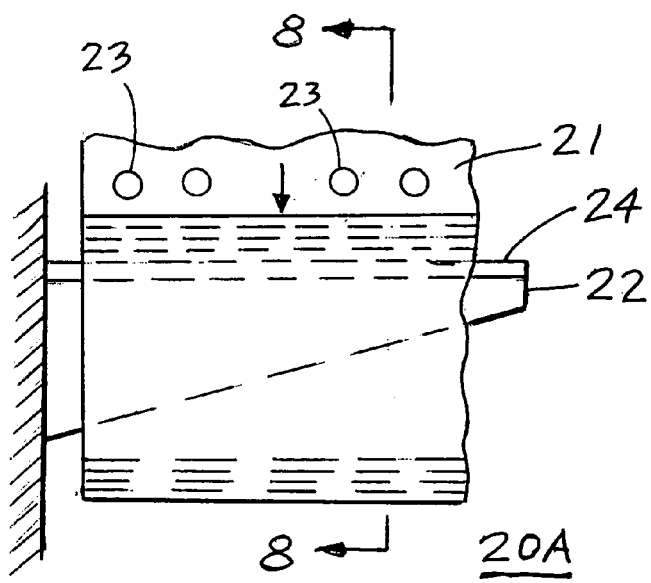
FIG. 7 is a diagrammatic, side elevational view of heat sealing press fixture, with two channels being fastened together by welding their plastic coatings.
Figure 8:
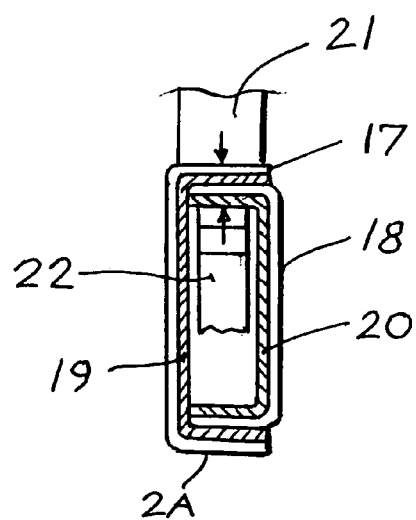
FIG. 8 is a diagrammatic, front sectional view of the heat sealing press fixture and two channels at the line 8—8 of FIG. 7.

Another embodiment of the invention is illustrated in FIGS. 7 and 8, showing one method of heat sealing and welding channels 17 and 18 together, in hot clamping fixture or device 20A comprising: hard, preferably aluminum metal support 22 of cantilever construction having compliant layer 24 on top, which may be of silicone rubber or teflon, and metal clamp 21 with electric heaters 23. Clamp 21 may have also a compliant layer, similar to layer 24 (not shown). Controlled heat and pressure by well known means is applied to the assembly for a controlled time period, to melt and then to cool the plastic layer 19 and thus bond and seal the channels 17 and 18 together to form the tube 2A. The layers 19 and 20 serve as an electrical insulation inside of the enclosure, and later to heatweld the tube 2A to the plugs 6 or 6A and 4 or 4B. Optionally, the support 22 may have also embedded-in or otherwise attached electric heaters, like flat blanket heaters, (not shown). The clamp 21 is removable, preferably in upward direction.

Figure 9:
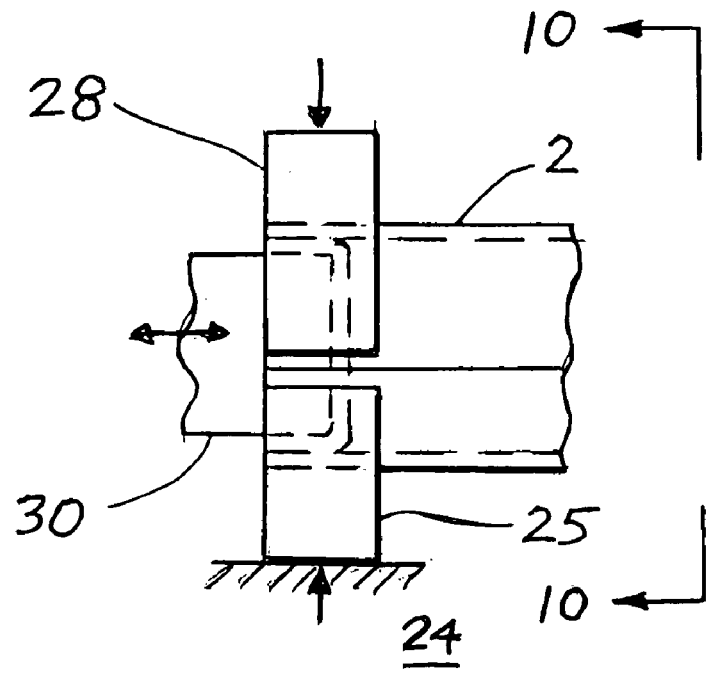
FIG. 9 is a diagrammatic side elevational view of another heat sealing press fixture with the enclosure's tubing and end plug being fastened together by welding of their plastic interfaces.
Figure 10:
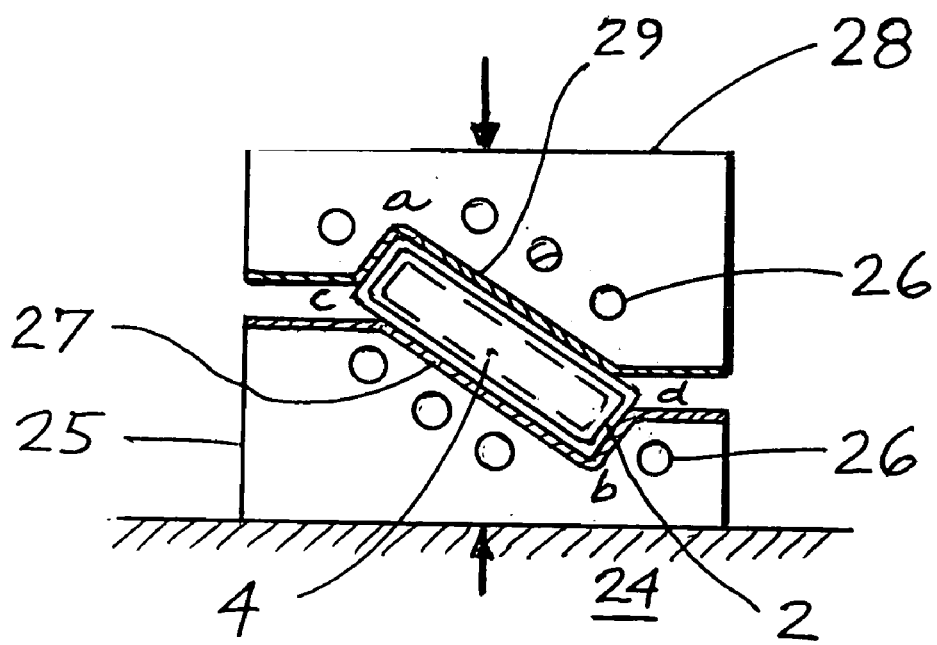
FIG. 10 is a diagrammatic, front elevational view of the heat sealing press fixture, the enclosure's tubing and end plug at the line 10—10 of FIG. 9.

Another embodiment of the invention is illustrated in FIGS. 9 and 10, showing one method of heat sealing and welding the plastic coated or cladded tube 2 or 2A, or vessel 15 to the plastic plugs 6 or 6A, or 4 or 4B in hot clamping fixture or device 24, comprising: hard, preferably aluminum metal support clamp 25 having inserted heaters 26 therein, and optionally a compliant layer 27 attached as shown, which layer may be of silicone rubber or teflon; vertically removable, hard and preferably of aluminum metal clamp 28 having additional heaters 26 inserted therein and optionally compliant layer 29 attached as shown, which layer may be of the same material as the layer 27; and optional filler arbor 30, which is horizontally removable and may be of heat insulating tough plastic composite. The arbor 30 is not used when the plug 6 or 6A, or 4B are welded to the tube 2 or 2A. After aligning the parts as shown in FIGS. 1–4 or 11, 12, and 13, and 9–10, controlled heat and pressure by well known means is applied to the particular assembly for controlled "on" time period, to melt and then to cool the plastic layers. The pressure is then released and the plugs at their interfaces with the plastic layer are thus welded, bonded and hermetically sealed together with the plastic layers of the tubing to form the enclosure 1. It should be noted that the hot clamping fixture or device 24 as shown in FIGS. 9 and 10 provides for even pressure and heat onto the enclosure sides and corners. The pressure is applied approximately in 45° direction to the tubing's or vessel's walls and the plug's surface as shown in the front view (FIG. 10), which makes a good sealing of the corners possible. This method is another embodiment of the invention. After applying heat and pressure on the corners "a" and "b", the enclosure is rotated 180° lengthwise and the heat sealing step is repeated to apply the heat and pressure on the corners "c" and "d". Temperature, pressure and minimum weld time should be custom adjusted to match the selected plastic of the coatings and plugs, for proper welding. Although the FIGS. 9 and 10 show heat sealing of the only one plug at a time, it is apparent to a person skilled in the art that the hot clamping device 24 can be modified to heatseal both plugs at once, and for example by doubling the components of the clamping device. The heaters 26 may be also replaced by an ultrasonic welding system with modified support 25 and clamp 28 for such welding.

EXAMPLE OF THE ENCLOSURE MANUFACTURE AND PACK ASSEMBLY

Figure 2:
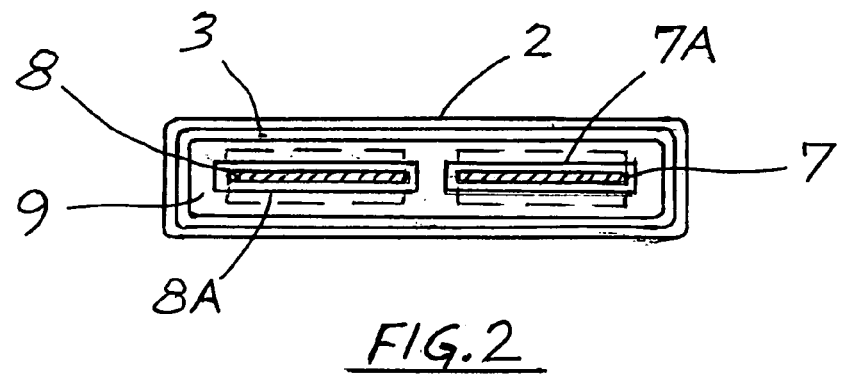
FIG. 2 is a diagrammatic, front view of the enclosure, illustrating plastic coated tubing, plastic plug and terminal.
Figure 3:
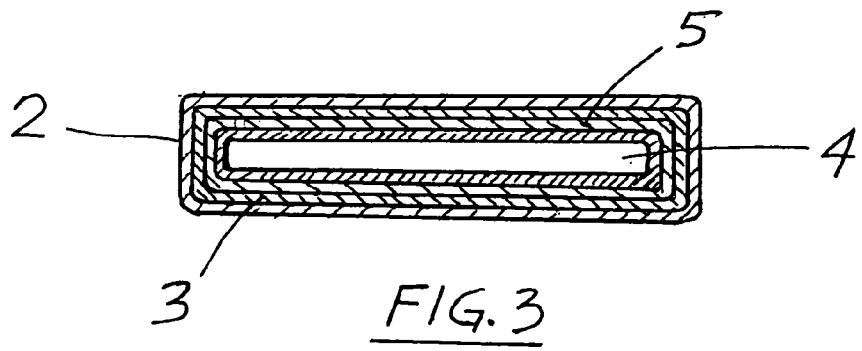
FIG. 3 is a diagrammatic back elevational, sectional view of the enclosure, at the line 3—3 of FIG. 1, illustrating tubing, end plug and their plastic coating layers.

1. The enclosure size was designed to accept snugly desired prismatic electrochemical device, which was a stack of 5 parallel connected hybrid lithium-ion-polymer cells, as described in our prior patent application Ser. No. 10/119,220.
2. Solid plastic plugs 6 and 4B were molded from Surlyn resin as manufactured by DuPont Corp. Wilmington, Del. and as shown in FIGS. 1, 2 and 4A. The plugs 6 was made from two halves in order to encapsulate and trap-in two terminals 7 and 8, by heat-weld and pressure.
3. Aluminum metal foils 9 and 13 were fabricated and attached to corresponding plugs 6 and 4A by heat and pressure, as shown in FIGS. 1, 2 and 4A.
4. Two aluminum metal sheets 0.015" thick were cut into desired rectangular sections and each was laminated together with 3 mils thick Surlyn film on its entire one side surface, using commercially available laminator and a polyester film folder.
5. Two laminated sheets were bent on sheet metal brake to form two channels 17 and 18 as shown in FIG. 5.
6. The channels of item 5 were assembled together as shown in FIGS. 5 and 6 and two times heat bonded together in the fixture as shown in FIGS. 7 and 8 to form the tube 2A.
7. The plug 4B with foil 13 was assembled into the tube 2A as shown in FIG. 4A and two times heat bonded together in the fixture as shown in FIGS. 9 and 10.
8. Plug 6 with terminals 7 and 8 embedded-in and foil 9 attached was ultrasonically welded to terminal tabs 10 of cells in the stack, by the terminals 7 and 8, and this subassembly was vacuum dried and inserted into the tube 2A, as shown in FIG. 4, under argon atmosphere.
9. Plug 6 was then heat bonded and sealed to the tube 2A in the fixture shown in FIGS. 9 and 10, under argon atmosphere, to form the sealed enclosure of cells.
10. Metered amount of well known electrolyte was injected through a small hole drilled in the back plug 4B and the hole was then closed with a press fit pin and heat sealed by hot iron.

Because the lithium polymer based electrochemical deices are laminated together, they do not require the holding pressure by their outside casings. The described had and punch-proof enclosure of the invention in case of lithium polymer cells can be relatively thin, lightweight, and of unlimited size, but should be thicker than the prior art soft aluminum foil pouch, to provide a good protection to the cells. Other devices may require thicker enclosures.

It should, of course, be understood that the description and the drawings herein are merely illustrative and it will be apparent that various modifications, combinations and changes can be make of the structures disclosed without departing from the spirit of the invention and from the scope of the appended claims.

It will thus be seen that a more economical and reliable method for electrochemical devices' prismatic packaging, and improved enclosure's structures have been provided with which the objects of the invention are achieved.

We claim:

1. Prismatic packaging structure for electrochemical devices which comprises
    a rectangular cross section hard metal tubing having inside and outside surfaces, and front and back ends, having at least on said inside surface of said tubing a heat sealable plastic layer,
    a rectangular metal back end plug having inside and out surfaces, and having at least, on said outside surface of said back end plug a heat sealable plastic layer,
    a rectangular heat sealable plastic front end plug having embedded and sealed metal terminals therein, and having front surface, said front surface of said front end plug having attached a metal layer,
    said metal terminals passing through said front end plug and without contact with said metal layer,
    an electrochemical device inserted into said tubing and electroconductively connected to said terminals,
    said plugs inserted into said tubing's front and back ends,
    said heat sealable plastic layer on said tubing is in contact with said heat sealable plastic layer on said back end plug and with said heat sealable plastic front end plug, whereby said plastic layers and said plug can be heat sealed and bonded together to enclose and contain said electrochemical device.

2. Prismatic packaging structure for electrochemical devices which comprises
    a rectangular cross section hard metal tubing having inside and outside surfaces, and front and back ends, having at least on said inside surface of said tubing a heat sealable plastic layer,
    a rectangular heat sealable plastic back end plug having back surface, said back surface of said back end plug having attached a metal layer,
    a rectangular heat sealable plastic front end plug having embedded and sealed metal terminals therein, and having front surface, said front surface of said front end plug having attached a metal layer, said metal terminals passing through said front end plug without contact with said metal layer,
    an electrochemical device inserted into said tubing and electroconductively connected to said terminals,
    said plugs inserted into said tubing's front and back ends,
    said heat sealable plastic layer on said tubing is in contact with said heat sealable plastic front end plug and with said heat sealable plastic back end plug,
    whereby said plastic layer and said plastic plugs can be heat sealed and bonded together to enclose and contain said electrochemical device.

3. Prismatic packaging structure for electrochemical devices which comprises
    a rectangular cross section hard metal tubing having inside and outside surfaces, and front and back ends, having at least on said inside surface of said tubing a heat sealable plastic layer,
    a rectangular solid metal back end plug having outside surface, on said outside surface of said back end plug having a heat sealable plastic layer,
    a rectangular heat sealable plastic front end plug having embedded and sealed metal terminals therein, and having front surface, said front surface of said front end plug having attached a metal layer, said metal terminals passing through said front end plug without contact with said metal layer,
    an electrochemical device inserted into said tubing and electroconductively connected to said terminals,
    said plugs inserted into said tubing's front and back ends,
    said heat sealable plastic layer on said tubing is in contact with said heat sealable plastic front end plug and with said heat sealable plastic layer on said back end plug,
    whereby said plastic layers and said plastic plug can be heat sealed and bonded together to enclose and contain said electrochemical device.

4. Prismatic packaging structure for electrochemical devices which comprises
- a rectangular cross section hard metal tubing having inside and outside surfaces, and front and back ends, having at least on said inside surfaces of said tubing a heat sealable plastic layer,
- a rectangular heat sealable plastic back end plug having embedded and sealed metal terminals therein and having back surface, said back surface of said back end plug having attached a metal layer,
- said metal terminals passing through said back end plug without contact with said metal layer,
- a rectangular heat sealable plastic front end plug having embedded and sealded metal terminals therein, and having front surface, said front surface of said front end plug having attached a metal layer, said metal terminals passing through said front end plug without contact with said metal layer.
- electrochemical devices inserted into said tubing and electroconductively connected to said, front end and back end plugs' terminals,
- said plugs inserted into said tubing's front and back ends,
- said heat sealable plastic layer on said tubing is in contact with said heat sealable plastic front end plug and with said heat sealable plastic back end plug,
- whereby said plastic layer and said plastic plugs can be heat sealed and bonded together to enclose and contain said electrochemical devices.

5. Prismatic packaging structure for electrochemical devices which comprises
- a rectangular cross section hard sheet metal vessel having front and back ends, said front end is open, and said vessel having inside and outside surfaces, having at least on said inside surface of said vessel a heat sealable plastic layer,
- a rectangular heat sealable plastic front end plug having embedded and sealed metal terminals therein, and having front surface, said front surface of said front end plug having attached a metal layer, said metal terminals passing through said front end plug without contact with said metal layer,
- an electrochemical device inserted into said vessel and electroconductively connected to said terminals,
- said plug inserted into said vessels' front end,
- said heat sealable plastic layer on said vessel is in contact with said heat sealable plastic front end plug, whereby said plastic layer and said plastic plug can be heat sealed and bonded together to enclose and contain said electrochemical device.

6. Prismatic packaging structure for electrochemical devices which comprises
- a square cross section hard metal tubing having inside and outside surfaces, and front and back ends, having at least on said inside surface of said tubing a heat sealable plastic layer,
- a square metal back end plug having inside and outside surfaces, having at least on said outside surface of said back end plug a heat sealable plastic layer,
- a square heat sealable plastic front end plug having embedded and sealed metal terminals therein, and having front surface, said front surface of said front end plug having attached a metal layer,
- said metal terminals passing through said front end plug without contact with said metal layer, an electrochemical device inserted into said tubing and electroconductively connected to said terminals,
- said plugs inserted into said tubing's front and back ends,
- said heat sealable plastic layer on said tubing is in contact with said heat sealable plastic layer on said back end plug and with said heat sealable plastic front end plug, whereby said plastic layer and said plug can be heat sealed and bonded together to enclose and contain said electrochemical device.

7. Prismatic packaging structure for electrochemical devices which comprises
- a square cross section hard metal tubing having inside and outside surfaces, and front and back ends, having at least on said inside surface of said tubing a heat sealable plastic layer,
- a square heat sealable plastic back end plug having back surface, said back surface of said back end plug having attached a metal layer,
- a square heat sealable plastic front end plug having embedded and sealed metal terminals therein, and having front surface, said front surface of said front end plug having attached a metal layer, said metal terminals passing through said front end plug without contact with said metal layer,
- an electrochemical device inserted into said tubing and electronductively connected to said terminals,
- said plugs inserted into said tubing's front and back ends,
- said heat sealable plastic layer on said tubing is in contact with said heat sealable plastic front end plug and with said heat sealable plastic back end plug, whereby said plastic layer and said plastic plugs can be heat sealed and bonded together to enclose and contain said electrochemical device.

8. Prismatic packaging structure for electrochemical devices which comprises
- a square cross section hard metal tubing having inside and outside surfaces, and front and back ends, having at least on said inside surface of said tubing a heat scalable plastc layer,
- a square solid metal back end plug having outside surface, on said outside surface of said back end plug having a heat sealable plastic layer,
- a square heat sealable plastic front end plug having embedded and sealed metal terminals therein, and having front surface, said front surface of said front end plug having attached a metal layer, said metal terminals passing through said front end plug without contact with said metal layer,
- an electrochemical device inserted into said tubing and electroconductively connected to said terminals,
- said plugs inserted into said tubing's front and back ends,
- said heat sealable plastic layer on said tubing is in contact with said heat sealable plastic front end plug and with said heat sealable plastic layer on said back end plug, whereby said plastic layers and said plastic plug can be heat sealed and bonded together to enclose and contain said electrochemical device.

9. Prismatic packaging structure for electrochemical devices which comprises
- a square cross section hard metal tubing having inside and outside surfaces, and front and back ends, having at least on said inside surface of said tubing a heat sealable plastic layer,
- a square heat sealable plastic back end plug, having embedded and sealed metal terminals therein, and having front back surface, said back surface of said back end plug having attached a metal layer, said metal terminals passing through said back end plug without contact with said metal layer, a square heat sealable plastic front end plug having embedded and sealed metal terminals therein, and having front surface said front surface of said front end plug having attached a metal layer, said metal terminals passing through said front end plug without contact with said metal layer, electrochemical devices inserted into said tubing and electroconductively connected to said front end and back end plugs' terminals, said plugs inserted into said tubing's front and back ends, said heat sealable plastic layer on said tubing is in contact with said heat sealable plastic front end plug and with said heat sealable plastic back end plug, whereby said plastic layer and said plastic plugs can be heat sealed and bonded together to enclose and contain said electrochemical devices.

10. Prismatic packaging structure for electrochemical devices which comprises a square cross section hard sheet metal vessel having front and back ends, said front end is open, and said vessel having inside and outside surfaces, having at least on said inside surface of said vessel a heat sealable plastic layers, a square heat sealable plastic front end plug having embedded and sealed metal terminals therein, and having front surface, said front surface of said front end plug having attached a metal layer, said metal terminals passing through said front end plug without contact with said metal layer, an electrochemical device inserted into said vessel and electroconductively connected to said terminals, said plug inserted into said vessel's front end, said heat sealable plastic layer on said vessel is in contact with said heat sealable plastic front end plug, whereby said plastic layer and said plastic plug can be heat sealed and bonded together to enclose and contain said electrochemical device.

11. Prismatic packaging structure for electrochemical devices as described in claims 1, or 2, or 3, or 4, or 6, or 7, 8, or 9, or 10, in which said tubing is constructed from two hard sheet metal channels, said channels having flanges and inside and outside surfaces, said channels having on at least said inside surfaces heat sealable plastic layers, said channels are assembled to with said flanges in overlying relation, said heat sealable plastic layers are in contact with said flanges, whereby said plastic layers and said can be heat sealed and bonded together to form said tubing.

12. Prismatic packaging structure for electrochemical devices as described in claims 1, or 2, or 3, or 4 or 6, or 7, or 8, or 9, or 10, in which said tubing is a seamless extrusion.

13. Prismatic packaging structure for electrochemical devices as described in claims 1, or 2, or 3, or 6, or 7, or 8, or 9, in which said tubing is a tubing with a seam.

14. Prismatic packaging structure for electrochemical devices as described in claims 1, or 2, or 3, or 4, or 5, or 6, or 7, or 8, or 9, or 10, in which said heat sealable, plastic layers and heat sealable plastic plugs are made of materials selected from the group comprising: Surlyn plastic, polyethylene, polyproylene, vinylacetate, and polyvinylidene fluoride polymers, their alloys, copolymers and derivatives with acid salt groups.

15. Prismatic packaging structure for electrochemical devices as described in claims 1, or 2, or 3, or 4, or 5, or 6, or 7, or 8, or 9, 10, in which said metal tubing metal layers, metal vessel, metal plugs, and metal channels are made of metals selected from the group comprising: aluminum, magnesium, titanium, and stainless steel.

16. Prismatic packaging structure for electrochemical devices as described in claims 1, or 2, or 3, or 4, or 5, or 6, or 7, or 8, or 9, or 10, in which said heat sealable plastic layer on said tubing and said vessel is omitted.

17. Prismatic packaging structure for electrochemical devices as described in claims 1, or 3, or 6, or 8, in which said heat sealable plastic layer on said metal end plugs is omitted.

18. Prismatic packaging structure for electrochemical devices as described in claims 1, or 2, or 3, or 4, or 5, or 6, or 7, or 8, or 9, or 10, in which said electrochemical device is a prismatic electrochemical device.

19. Prismatic packaging structure for electrochemical devices as described in claims 1, or 2, or 3, or 4, or 5, or 6, or 7, or 8, or 9, or 10, in which said electrochemical device is a battery.

20. Prismatic packaging structure for electrochemical devices as described in claims 1, or 2, or 3, or 4, or 5, or 6, or 7, or 8, or 9, or 10, in which said electrochemical device is a capacitor.

21. Prismatic packaging structure for electrochemical devices as described in claims 1, or 2, or 3, or 4, or 5, or 6, or 7, or 8, or 9, or 10, in which said electrochemical device is a lithium based cell.

22. Prismatic packaging structure for electrochemical devices as described in claims 1, or 2, or 3, or 4, or 5, or 6, or 7, or 8, or 9, or 10, in which said electrochemical device is a metal hydride based cell.

23. Prismatic packaging structure for electrochemical devices as described in claims 1, or 2, or 3, or 4, or 5, or 6, or 7, or 8, or 9, or 10, in which said electrochemical device is an ultracapacitor.

24. Prismatic packaging structure for electrochemical devices as described in claims 1, or, 2, or 3, or 4, or 5, or 6, or 7, or 8, or 9, or 10, in which said electrochemical device is activated by a liquid electrolyte.

25. Prismatic packaging structure for electrochemical devices as described in claims 1, or 2, or 3, or 4, or 5, or 6, or 7, or 8, or 9, or 10, in which said electrochemical device is shimmmed by a compressible sheet.

26. Prismatic packaging structure for electrochemical devices as described in claim 25, in which said sheet is of a non-woven fabric.

27. Prismatic packaging structure for electrochemical devices as described in claim 25, in which said sheet is of a woven fabric.

28. Prismatic packaging structure for electrochemical devices as described in claims 1, or 2, or 3, or 4, or 5, or 6, or 7, or 8, or 9, or 10, in which said plastic end plugs are replaced with metal end plugs having outside surfaces and said outside surfaces of said metal end plugs having a heat sealable plastic layers, said metal end plugs having metal terminals sealed in by an electrically insulating substance, and said metal terminals passing through said metal end plugs without contact with said metal plugs, said heat scalable plastic layer on said tubing is in contact with said heat sealable plastic layers on said metal end plugs, whereby said plastic layers can be heat sealed and bonded together to enclose and contain said electrochemical device.

29. Prismatic packaging structure for electrochemical devices as described in claim 28, in which said electrically insulating substance is a glass.

30. Prismatic packaging structure for electrochemical devices as described in claim 28, in which said electrically insulating substance is a plastic.

31. Prismatic packaging structure for electrochemical devices as described in claims 1, or 2, or 3, or 4, or 5, or 6, or 7, or 8, or 9, or 10, in which said heat sealable plastic layers are attached to said metals and each other by heat and pressure and then cooling.

32. A method of assembly and sealing of prismatic packaging enclosure for electrochemical devices, comprising the steps of:

providing a length of rectangular cross section metal tubing, said tubing having walls, front and back ends and inside and outside surfaces, and having a heat sealable plastic layer on at least said inside surface, providing a matching rectangular heat sealable front end plug with sealed and insulated metal terminals passing through said plug, providing an electrochemical device and connecting electroconductively said device to said terminals, providing a matching rectangular heat sealable back end plug, providing a heat-sealing clamping device having clamps with controlled temperature, pressure and "on" time duration intervals, said clamping device having clamps matching said cross section of said tubing, and having said clamps' dividing line diagonally on said cross section of said tubing, inserting said electrochemical device and said front end plug into said tubing's front end, and said back end plug into said tubing's back end, said plugs being in contact with said tubing's inside plastic layer, inserting said tubing with said plugs into said clamping device, and applying heal and pressure approximately in direction 45° to said walls of said tubing in front view for a preset time period, to provide heatsealing step, removing and rotating 180° lengthwise said tubing with said plugs, inserting again said tubing with said plugs into said clamping device and repeating said heatsealing step, whereby welding and bonding together said plugs to said tubing and hermetically sealing said device therein.

33. A method of assembly and sealing of prismatic packaging enclosure for electrochemical devices, comprising the steps of:

providing a length of rectangular cross section metal vessel, said vessel having walls, front ends and inside and outside surfaces, and having a heat sealable plastic layer on at least said inside surface, providing a matching rectangular heat sealable front end plug with sealed and insulated metal terminals passing through said plug, providing an electrochemical device and connecting electroconductively said device to said terminals, providing a heat-sealing clamping device having clamps with controlled temperature, pressure and "on" time duration intervals, said clamping device having clamps matching said cross section of said vessel, and having said clamps' dividing line diagonally on said cross section of said vessel, inserting said electrochemical device and said front end plug into said vessel's front end, said plugs being in contact with said vessel's inside plastic layer, inserting said vessel with said plugs into said clamping device, and applying heat and pressure approximately in direction 45° to said walls of said vessel in front view for preset "on" time period, cooling said assembly and then releasing said pressure to provide heatsealing step, removing and rotating 180° lengthwise said vessel with said plug, inserting again said vessel with said plug into said clamping device and repeating said heatsealing step, whereby welding and bonding together said plug to said tubing and hermetically sealing said device therein.

34. A method of assembly and sealing of prismatic packaging enclosure for electrochemical devices as described in claim 32, in which said rectangular cross section, tubing and said rectangular plugs are replaced by square cross section tubing and square plugs.

35. A method of assembly and sealing of prismatic enclosure for electrochemical devices as described in claim 33, in which said rectangular cross section vessel and rectangular plug are replaced by square cross section vessel and square plug.

36. A method of assembly and sealing of prismatic enclosure for electrochemical devices as described in claims 32, or 33, or 34, or 35, in which said clamping device's clamps are compliant clamps.

37. A method of assembly and sealing of a rectangular tubing for prismatic packaging of electrochemical devices, in which said tubing is constructed from two metal channels and said method comprises the steps of:

providing two lengths of metal "u" section channels, said channels having first and second flanges and inside surfaces, and said channels having heat sealable plastic layers on said inside surfaces, providing heat sealing clamping device having cantilever support and clamps, and having controllable heat, pressure and "on" time intervals, said support and clamps are longer than said lengths of said channels, and narrower than said flanges and said support is fitting inside of said channels, assembling said channels together lined-up with said flanges in overlying relation and with said heat sealable plastic layers in contact with said flanges, inserting said assembly onto said support, applying heat and pressure on said first flanges for a preset "on" time period, cooling said assembly and then releasing said pressure, to provide heat sealing step, removing and rotating said assembly 180°, and repeating said heat sealing step for said second flanges, to heat-seal and bond together said plastic layers and said flanges to form said sealed tubing.

38. A method of assembly and sealing of a square tubing for prismatic packaging of electrochemical devices, in which said tubing is constructed from two metal channels and said method comprises the steps of:

providing two lengths of metal "u" section channels, said channels having first and second flanges and inside surfaces, and said channels having heat sealable plastic layers on said inside surfaces, providing heat sealing clamping device having cantilever support and clamp, and controllable heat, pressure and "on" time intervals, said support and clamp are longer than said lengths of said channels, and narrower than said flanges and said support is fitting inside of said channels, assembling said channels together lined-up with said flanges in overlying relation and with said heat sealable plastic layers in contact with said flanges, inserting said assembly onto said support, applying heat and pressure on said first flanges for a preset "on" time period, cooling said assembly and then releasing said pressure, to provide heat sealing step, removing and rotating said assembly 180°, and repeating said heat sealing step for said second flanges, to heat-seal and bond together said plastic layers and said flanges to form said sealed tubing.

* * * * *